No. 806,295. PATENTED DEC. 5, 1905.
I. W. SCHMIDT.
WHEEL CHAIR TRACTOR.
APPLICATION FILED DEC. 7, 1903. RENEWED OCT. 26, 1905.
2 SHEETS—SHEET 1.
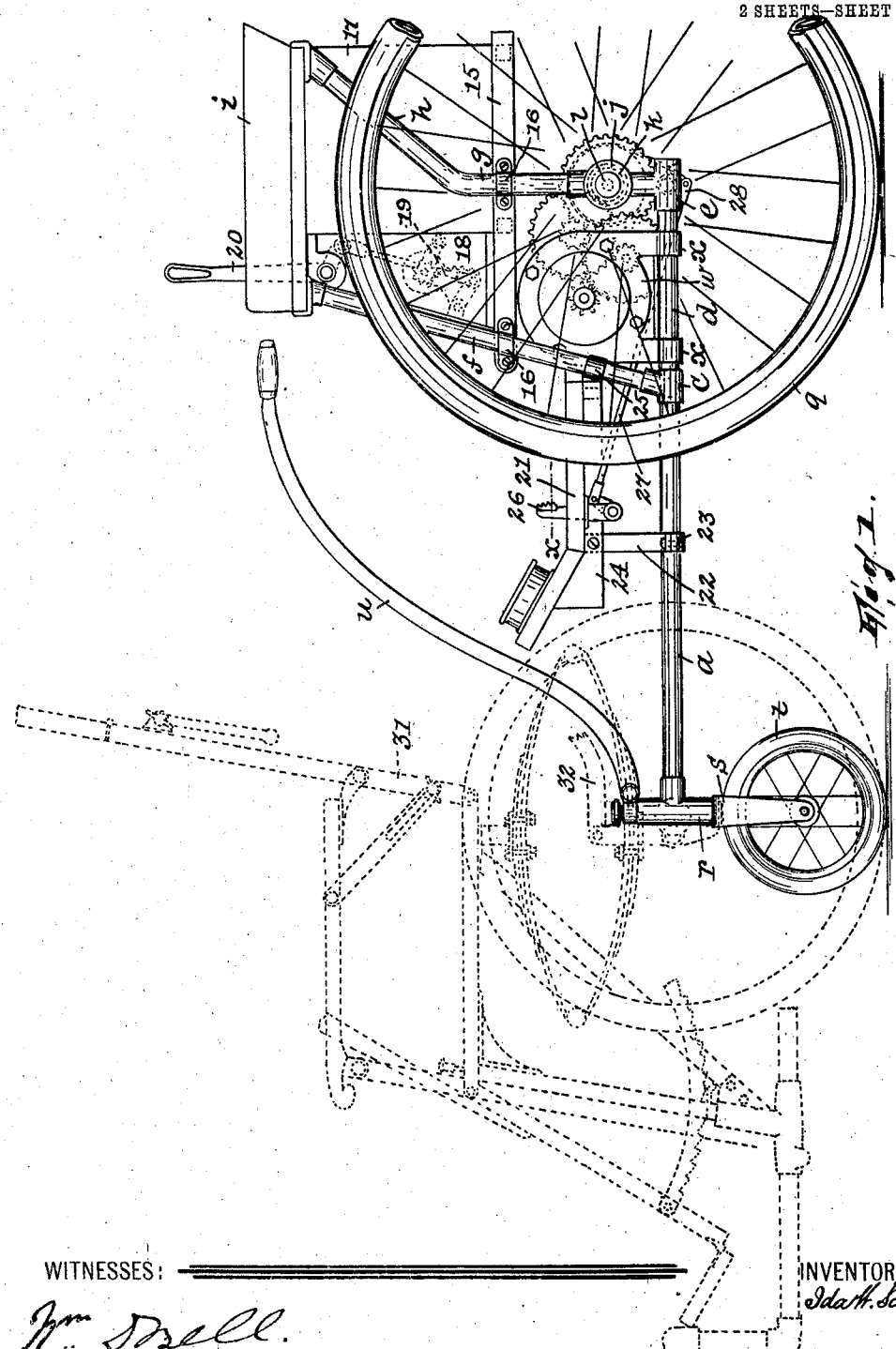
WITNESSES:
INVENTOR
BY
ATTORNEYS.

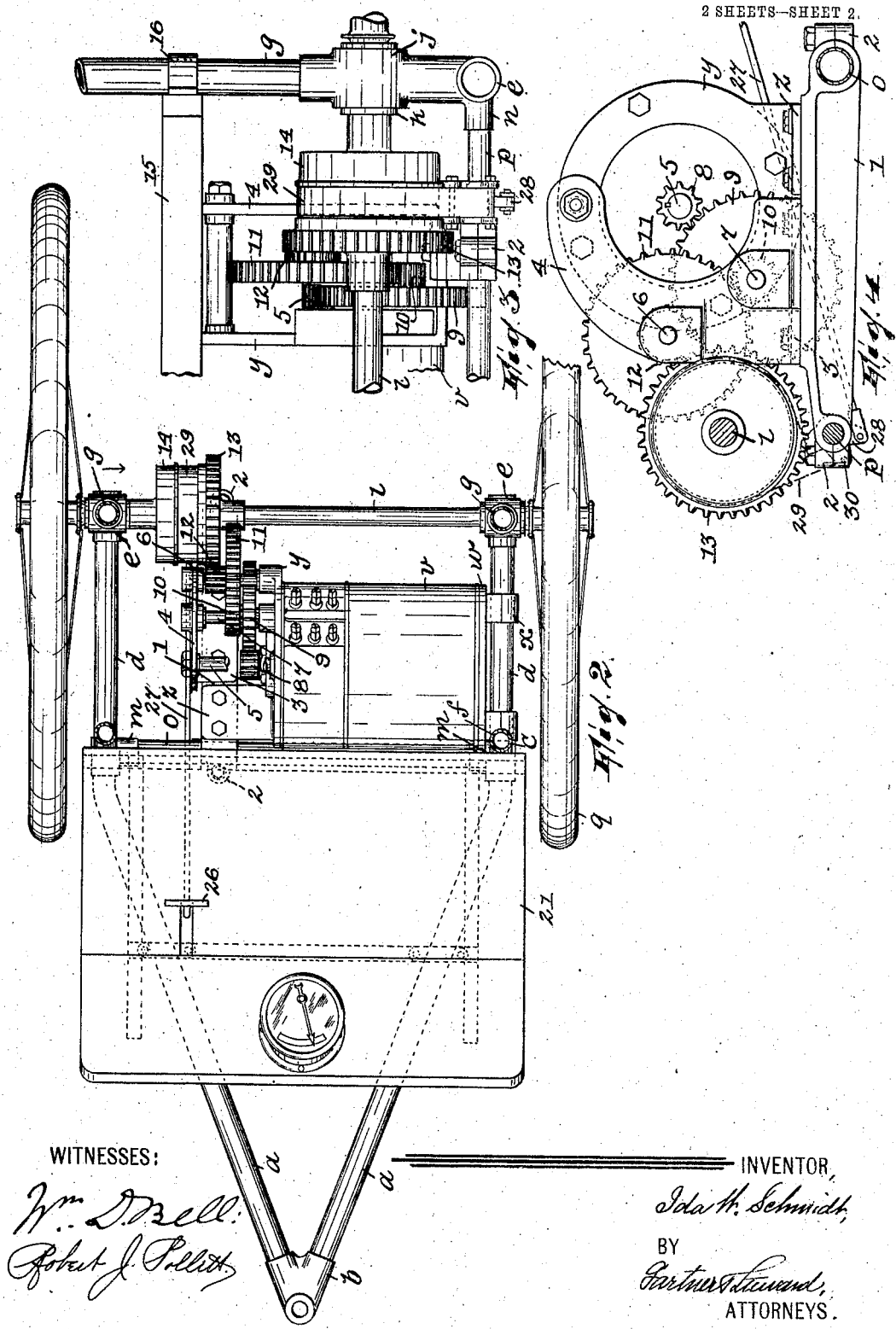

UNITED STATES PATENT OFFICE.

IDA W. SCHMIDT, OF NEW YORK, N. Y.

WHEEL-CHAIR TRACTOR.

No. 806,295.

Specification of Letters Patent.

Patented Dec. 5, 1905.

Application filed December 7, 1903. Renewed October 26, 1905. Serial No. 284,466.

*To all whom it may concern:*

Be it known that I, IDA W. SCHMIDT, a citizen of the United States, residing in the city, county, and State of New York, have invented certain new and useful Improvements in Wheel-Chair Tractors; and I do hereby declare the following to be a full, clear, and exact description of the invention, such as will enable others skilled in the art to which it appertains to make and use the same, reference being had to the accompanying drawings, and to letters and numerals of reference marked thereon, which form a part of this specification.

The object of this invention is to provide a tractor adapted to be used in connection with a wheel-chair and arranged to be detachably connected therewith, so that the tractor may be either used with the chair or used alone.

Minor objects are to so construct the tractor as to make the same durable, so as to withstand the effects of road use, comparatively light in weight, so as to require the minimum of power to drive it and the chair when the two are connected, and inexpensive to build.

My invention will be found fully illustrated in the accompanying drawings, wherein—

Figure 1 is a view of my improved tractor in side elevation and showing the chair in dotted outline and detached. Fig. 2 is a horizontal sectional view on the line $x$ in Fig. 1. Fig. 3 is a somewhat enlarged view of the gearing connecting the motor of the tractor with its rear axle as seen from the rear of the tractor; and Fig. 4 is an enlarged view, in side elevation, of the tractor's driving mechanism as seen when looking in the direction of the arrow in Fig. 2.

$a\,a$ are two convergent horizontal tubes terminating at their front ends in a V-shaped union $b$ and at their rear ends in inverted-T-shaped unions $c$. From these latter unions extend rearwardly parallel horizontal tubes $d$, each of which terminates in an inverted T $e$. Each union $c$ receives the lower end of one of two rearwardly-inclined front uprights $f$, while each T $e$ receives a rear upright $g$, which extends vertically for approximately half its length and then is inclined rearwardly, as at $h$. These uprights $f$ and $g$ carry the driver's seat $i$. In the vertical portion of each T $e$ is formed a horizontal sleeve or bearing-box $j$, which receives one of the two bushings $k$, in which the rear axle $l$ of the tractor is journaled. Each T $c$ and each T $e$ has an inward projection $m\,n$, respectively, the projections $m$ receiving a tubular brace $o$ and the projections $n$ a brace-rod $p$.

The foregoing parts constitute the essential parts of the frame of the tractor. Arranged substantially as above described, these parts go to make up a frame which is both exceedingly light and of durable construction. By inclining the uprights $f$ and imparting to the upper ends of the uprights $g$ a rearward inclination, while their lower portions are substantially vertical, the stability of the portion of the frame comprised in these parts is materially enhanced, and, besides, the seat $i$ is made to be brought in such disposition relatively to the axle $l$ as to properly place the center of gravity.

$q$ designates the main or rear wheels, the same being fast on the axle $l$.

The union $b$ is formed with a vertical tubular portion $r$, in which is journaled the spindle portion of a fork $s$, carrying the steering-wheel $t$ and at its upper end the steering-handle $u$.

$v$ designates the shell of an electric motor, which may be of any suitable type. The head $w$ at one end of this shell has integral straps $x$, which receive the left horizontal tube $d$. The head $y$ at the other end of the motor is formed with a laterally-extending web $z$, which is bolted to a bridge-piece 1, whose ends are formed as clamps 2, receiving tubular brace $o$ and brace-rod $p$. The motor is thus sustained on the left horizontal tube $d$ and the bridge-piece 1. On the bridge-piece 1 is bolted the flange portion 3 of a bracket 4. (See Fig. 4.) This bracket and the head $y$ of the cylinder serve as bearings for the shaft 5 of the motor and two other shafts 6 and 7.

The shaft of the motor carries a pinion 8, which meshes with a gear 9, fixed on shaft 7. On said shaft 7 is another pinion 10, meshing with a gear 11 on shaft 6, and on said shaft 6 is a pinion 12, meshing with a gear 13, formed on the periphery of the casing 14 of a mechanism for compensating for differences in the speed of rotation of wheels $q$, as in turning, which said compensating mechanism may be of any suitable type, it being understood that the axle is divided, its adjoining ends meeting in casing 14.

15 is a rest secured by clamps 16 to the uprights $f$ and $g$ and carrying a source of power, as a storage battery, (not shown,) of any suitable type, 17 being the casing therefor. In side plates 18, projecting forwardly from this casing, is arranged the controller 19, having the operating-handle 20. Suitable electrical connections between the controller, the storage battery, and the motor (not shown) are provided.

21 is a foot-rest which rests on a frame consisting of vertical brackets 22, having clamps 23 at their lower ends, receiving the tubes $a$ and horizontal brackets 24, bolted to the brackets 22 at their upper ends and having their rear ends provided with clamps 25, secured to the uprights $f$. Brackets 22 and 24 incidentally impart strength and rigidity to the frame at the juncture of tubes $a$ and uprights $f$. In the foot-rest 21 is fulcrumed a lever 26, which is connected by a link 27 with another lever 28, fulcrumed on the brace-rod $p$ and connected with one end of a band-brake 29, passing around the casing 14 and secured at its other end to a fixed point, as 30.

The chair 31 is attached to the tractor by removing the fork $s$ and substituting a bolt or other pivot to connect the chair and the tractor, a steering-handle 32 being in that instance attached to the chair and projecting rearwardly in convenient proximity to the driver's seat $i$, the same as the handle $u$.

Having thus fully described my invention, what I claim as new, and desire to secure by Letters Patent, is—

1. The combination of a frame comprising horizontal side members, front and rear uprights carried by said side members, said rear uprights being extended first vertically and then bent rearwardly at an incline, a steering-wheel carrying supporting means for the front portion of said frame, an axle journaled in said rear uprights in their vertical portions, the rear wheels on said axle, driving means operatively connected with the axle and carried by said frame, and a seat sustained at the upper ends of said uprights, substantially as described.

2. The combination of a frame comprising horizontal side members, forward and rear uprights carried by said side members, horizontal brackets projecting forwardly from the front uprights and vertical brackets projecting upwardly from said side members, said horizontal and vertical brackets being bolted together, a foot-rest carried by said brackets, a seat carried by said uprights, a steering-wheel carrying supporting means for the front portion of the frame, an axle journaled in the rear portion of the frame, the rear wheels on said axle, and driving means operatively connected to said axle, substantially as described.

3. The combination of a frame comprising horizontal side members and transverse braces connecting said side members, a bridge-piece connecting said braces, a motor sustained on one of said side members and the bridge-piece, an axle journaled in said frame, the rear wheels on said axle, power-transmitting mechanism between the motor and the axle, and a steering-wheel-carrying means journaled in said frame, substantially as described.

In testimony that I claim the foregoing I have hereunto set my hand this 30th day of October, 1903.

IDA W. SCHMIDT.

Witnesses:
CHARLES H. KETCHAM,
MARY E. FARGO.